United States Patent Office 2,731,597
Patented Jan. 17, 1956

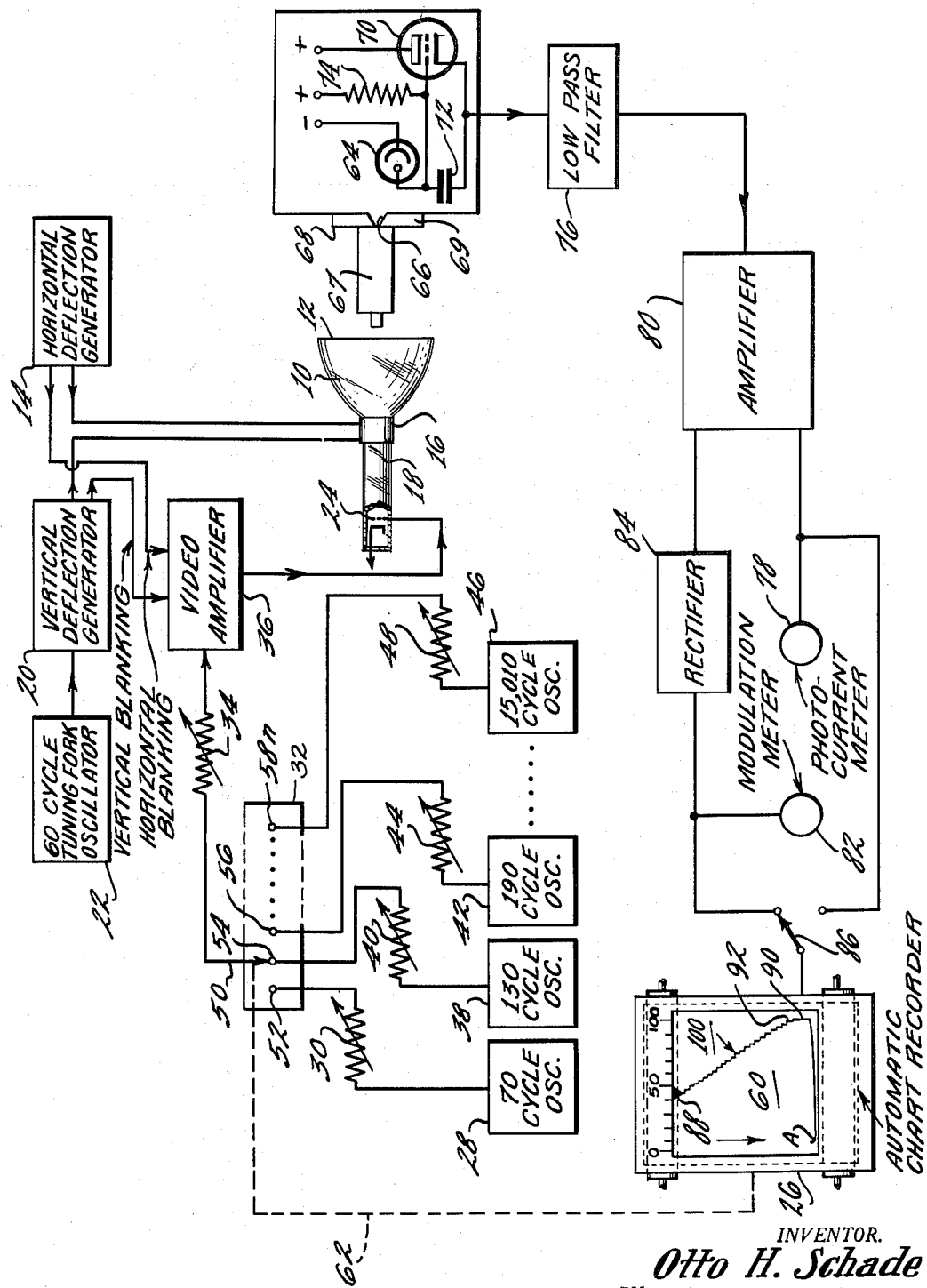

2,731,597

APPARATUS FOR MEASURING THE QUALITY OF A KINESCOPE

Otto H. Schade, West Caldwell, N. J., assignor to Radio Corporation of America, a corporation of Delaware Application October 1, 1954, Serial No. 459,774

11 Claims. (Cl. 324—20)

This invention relates generally to apparatus for measuring the quality of a kinescope, as a function of the kinescope's ability to transmit image detail information. More particularly the invention relates to a novel combination of electrical and optical components for measuring the optical sine-wave response of a kinescope, as a function of its quality. While neither specifically nor exclusively limited thereto, the apparatus of the present invention is particularly useful in testing the quality of kinescopes during the process of manufacturing.

In testing the quality of an electrical component, such as an amplifier or a filter, for example, it has been proposed to obtain the frequency response curve of the component to an electrical signal of known characteristics. The frequency response curve, thus obtained, to a square or sine-wave, for example, provides the engineer with information concerning the quality of the component. In accordance with the present invention, apparatus is provided for obtaining an optical response curve from the optical characteristics of a kinescope that is analogous to the frequency response curves obtained from electronic amplifiers or filters.

It is, therefore, a principal object of the present invention to provide a novel combination of apparatus for measuring the optical sine-wave amplitude response of a kinescope, as a function of electrical sine-wave input signals.

It is another object of the present invention to provide a novel combination of apparatus for furnishing a kinescope, under test, with a series of signals of known frequencies and amplitudes, and for obtaining a response curve from the optical characteristics of the kinescope.

It is a further object of the present invention to provide apparatus, for the measurement of an optical sine-wave response of a kinescope, that is relatively simple in construction and operation, and yet highly efficient in use.

These and further objects of the present invention are attained in a novel combination of electrical and optical components for measuring the optical sine-wave response of a kinescope of the type used in the ordinary television receiver. The kinescope, under test, is connected in a circuit whereby its electron beam is caused to scan the screen of the kinescope vertically and horizontally. In order to produce a sine-wave pattern on the kinescope screen, it is necessary to apply a sinusoidal modulation to the kinescope control grid. Stationary optical sine-wave images, that is, horizontal bars, are reproduced on the kinescope's screen when the electrical signal frequencies are integral multiples ($n$) of the vertical deflection frequency, or frame frequency. A slow constant velocity displacement drift of the sine-wave pattern in the vertical direction is obtained by having the electrical sine-wave modulation frequency differ slightly from an integral multiple of the frame frequency. When, for example, the frame frequency is 60 C. P. S. and the electrical sine-wave frequency is $(n \times 60) + 10$ C. P. S., the number of optical sine-waves in the frame will be $n + 10/60$, and the vertical drift frequency will be 10 C. P. S. with respect to a fixed point on the kinescope screen. Having thus established a vertical pattern displacement with a desired constant velocity of drift, a large number of horizontal scanning lines per unit of length are employed to make the line spacing considerably smaller than the kinescope electron beam diameter, in order to eliminate line structure. For this condition the optical sine-wave response of the kinescope is substantially continuous in the vertical direction, and can be analyzed by imaging a fixed portion of the screen, by means of a low powered microscope, on the slit of a photo tube. Because of the steady drift of the test image over the slit, the desired sine-wave response is the sinusoidal modulation envelope of the photo tube signal that has a frequency equal to the drift frequency, that is, 10 C. P. S. The signal carrier, which is a group of very short pulses repeating at frame time intervals, is filtered out by a low pass filter that passes the drift frequency but cuts off below the frame frequency. All test frequencies applied to the kinescope grid are of the same amplitude, and are given values resulting in a constant drift frequency inside the unattenuated pass band of the low pass filter. The demodulated output from the low pass filter may be read on a meter or recorded on an automatic recorder. The line number for a given modulating frequency may be calculated, and the amplitude of the demodulated signals from the low pass filters may be plotted against the lines per inch represented by a particular test frequency.

The novel features of the present invention, as well as the invention itself, both as to its organization and method of operation, will be understood in detail from the following description when considered in connection with the accompanying drawing in which the single figure is a schematic diagram of apparatus for measuring the sine-wave response of a kinescope, in accordance with the invention.

Referring now to the drawing, there is shown apparatus for measuring the optical sine-wave response of a kinescope 10. The kinescope 10 may be any cathode ray tube of conventional design, such as used in the ordinary receiver. Operating voltages (not shown) are applied to the kinescope 10 in order to provide an electron beam from an electron gun (not shown) therein, in the usual manner well known in the television art. These operating voltages, and some of the detailed structure of the kinescope 10, are not shown because their application and circuitry are very well known in the television art, and because it is desired to simplify the drawing so as to accentuate the combination of components for producing an optical sine-wave response of the kinescope 10, in accordance with the invention.

Means are provided to sweep the electron beam of the kinescope 10 simultaneously in a horizontal and vertical direction in order to obtain a raster on the screen 12 of the kinescope 10, in the usual manner. To this end, a horizontal deflection generator 14 is connected to the horizontal deflection coils (not shown) of a deflection yoke 16. The horizontal deflection yoke 16 surrounds the neck 18 of the kinescope 10, in the usual manner. A vertical deflection generator 20 is connected to the vertical deflection coils (not shown) of the deflection yoke 16 in order to sweep the electron beam vertically.

A stable 60 cycle oscillator 22, preferably of the tuning fork type, is connected to the vertical deflection generator 20 in a manner to synchronize the vertical generator 20, whereby it will provide at its output a scanning voltage having a very constant frequency of 60 C. P. S.

The horizontal deflection generator 14 provides an output voltage that may have a sweep frequency of about 31.5 kc., for example, for testing ordinary kinescopes. It will now be understood that the electron beam of the kinescope 10 scans its screen 12 vertically.

at 60 C. P. S. and horizontally at 31.5 kc. to provide the usual raster. For best results, the raster on the screen 12 is not interlaced. Means are provided to blank the horizontal and vertical scanning of the electron beam during its retraces, as will be hereinafter explained.

In order to produce a sine-wave pattern on the screen 12 of the kinescope 10 it is necessary to apply an A.-C. sine-wave voltage or sinusoidal modulation to the control grid 24 of the kinescope 10. To this end, there is provided a plurality of oscillators, each having a frequency output differing from the other by an integral multiple (n) of the frequency of the vertical deflection generator 20, that is, 60 C. P. S. If the frequency of the applied modulation to the grid 24 is an exact multiple of the frame frequency, that is, 60 C. P. S. in this case, the sine-wave pattern on the screen 12 of the kinescope 10 will appear as stationary horizontal sine-wave bars, of the line number determined by the ratio of the modulating frequency to half the vertical scanning frequency, because of the defined relationship that one electrical cycle produces two television lines; one bright line corresponding to the crest and one dark line corresponding to the trough of the sine-wave.

It will be shown, hereinafter, that a steady response factor reading on an automatic chart recorder 26, for example, makes it necessary that the sine-wave test pattern on the screen 12 drift continuously with respect to a fixed point on the screen 12.

Any drift rate, or drift frequency between zero and half the vertical frequency, may be obtained by a modulating frequency which is a multiple of the frame frequency, plus or minus the desired frequency of drift. Thus, a 70 cycle sine-wave oscillator 28, for example, connected to the grid 24 of the kinescope 10, through a series circuit comprising a variable resistor 30, a stepping relay switch 32, a variable resistor 34 and a video amplifier 36 will cause a sine-wave pattern to drift across the screen 12. The horizontal deflection generator 14 and the vertical deflection generator 20 are connected to the video amplifier 36 in a manner to provide horizontal and vertical blanking, respectively, in the retraces of the excursion of the electron beam of the kinescope 10, in a manner well known in the art. The variable resistors 30 and 34 function as attenuators of signals from the oscillator 28 to the video amplifier 36. It is noted that the sine-wave oscillator 28 will produce one full sine-wave pattern on the raster on the screen 12 that will have a drift frequency of 10 C. P. S. in a vertical direction.

A 130 cycle sine-wave oscillator 38 is connected to the stepping relay switch 32 through a variable resistor 40. It will now be understood that the sine-wave signals from the oscillator 38 will produce an optical sine-wave pattern of two full cycles on the screen 12 of the kinescope 10 that will also drift vertically at the rate of 10 C. P. S. In a similar manner, a 190 cycle sine-wave oscillator 42 is connected to the stepping relay switch 32 through a variable resistor 44 in order to provide three full cycles of the sine-wave pattern on the screen 12 of the kinescope 10 that will also drift vertically at the rate of 10 C. P. S. Thus, n sine-wave generators, each having a frequency $(n \times 60)+10$ C. P. S., may be connected to the stepping relay switch 32. n is an integer such that the output frequency of any sine-wave oscillator will not be greater than ½ of the horizontal deflection frequency. Hence, since the horizontal deflection frequency, used in the example herein, is 31.5 kc., n may have a value as great as 250. Consequently, a 15,010 cycle sine-wave oscillator 46 may also be connected to the stepping relay 32 through a variable resistor 48. It will now be understood, in the apparatus illustrated in the drawing, that n sine-wave generators may be connected to the stepping relay switch 32, where n may be 250. In practice however, 23 oscillators of progressively differing frequencies have been found satisfactory. The stepping relay switch 32 is linked mechanically to the automatic chart recorder 26 in a manner whereby a movable contact 50 of the relay switch 32 will be moved sequentially across the fixed contacts 52, 54, 56 . . . 58n as the paper 60 in the automatic chart recorder 26 is moved downward in the direction indicated by the arrow on the paper 60. The electro-mechanical linkage between the automatic chart recorder 26 and the movable contact 50 of the stepping relay 32 is indicated by the dashed line 62.

It will thus be seen that as a stepping relay switch 32 applies sine-wave signals, of constant amplitude, to the grid 24 of the kinescope 10 from the oscillators 28, 38, 42 . . . 46 sequentially, there will appear sine-wave patterns on the screen 12 of the kinescope 10 that will differ from each other in line number but each will have the same drift frequency, that is 10 C. P. S.

The line number for a given modulating frequency may be calculated from the formula:

$$n = \frac{2f_m}{v}(1-K_b)$$

where
$f_m$=Modulating signal frequency (C. P. S.)
$f_v$=Vertical frame frequency (C. P. S.)
$n$=Television line number
$K_b$=Vertical blanking percentage (X.01)

Because this formula assumes a linear vertical sweep and because the blanking percentage is somewhat difficult to measure, the line number per unit length may also be determined by direct measurement of the number of lines per vertical inch of raster, using a wooden ruler. It is also necessary that the raster line number be equal to or greater than the resolving power of the kinescope 10, and that the modulating frequency does not exceed one half the horizontal deflection frequency. It has been noted that as the modulating signal frequency exceeds one half of the horizontal scanning frequency an undesirable beat pattern appears on the screen 12 of the kinescope 10.

For cathode ray tubes having a vertical limiting resolution of about 500 lines, it would be possible for the raster to extend the entire height of the screen 12 in measuring the complete response characteristic thereof. Since some kinescopes have a greater resolution than this, it is necessary to decrease the raster height until the resolution limit of the kinescope is reached. For example, if a kinescope of 10 inch screen height, known to have about 1200 lines limiting resolution, is to be tested, it would be desirable to have the maximum frequency of modulation 15,010 C. P. S., at the cut off line number so that there would be a response at all test frequencies up to 15,010 C. P. S. Since 15,010 cycles produce about 467 active lines when used with a vertical time base of 60 C. P. S. and normal blanking, it will be necessary to compress the 467 lines into $467/1200$ of the picture height of 10 inches, or 3.9 inches, to reach the resolution limit of the tube. These relationships can be summarized by the general formula:

$$D = \frac{2Vf_m}{n_c f_v}(1-K_b)$$

where
D=required raster height on tube, inches
$n_c$=line number of limiting resolution of tube
V=screen height, inches
$f_v$=vertical or frame frequency, C. P. S.
$f_m$=modulating signal frequency, C. P. S.
$K_b$=vertical blanking percentage (X.01)

This formula simplifies to $$D \cong 467 \frac{V}{n_c}$$

for the standard test condition that $K_b$=6.5 per cent, $f_v$=60 C. P. S., and $f_m$max=15,010 C. P. S.

Optical signals caused by the vertical drifting sine-wave pattern on the screen 12 of the tube 10 are converted into electrical signals by photoelectric means, such as a multiplier phototube 64 (multiplier dynodes not shown) and its associated circuitry. The optical signals from the drifting sine-wave pattern on the screen 12, as for example at the center of the screen 12, are focused in the plane of a horizontal slit, by a magnifying lens system 67, defined by two adjacent opaque members 68 and 69 positioned between the phototube 64 and the magnifying lens system 67. The lens system 67 may comprise an achromatic microscope objective having a six power magnification. The cathode of the phototube 64 is connected to a source of suitable negative voltage (not shown) the anode of the phototube 64 is connected to the cathode of a cathode follower tube 70 through an integrating capacitor 72, for the purpose hereinafter appearing. The anode of the phototube 64 is also connected to the grid of the tube 70, and to a source of positive potential (not shown) through a resistor 74 of very high value. The anode of the tube 70 is connected to a source of suitable positive operating potential (not shown), and the cathode of the tube 70 is connected to the input of a low pass filter 76.

The low pass filter 76 has an impedance characteristic that is reflected back with much higher impedance to the input of the cathode follower tube 70 by the integrating capacitor 72. The low pass filter 76 is designed to permit the 10 cycle drift frequency to pass through but to attenuate the horizontal and vertical sweep frequencies.

The low pass filter 76 may be a constant $k$ type low pass filter which, together with the integrating capacitor 72 serves as means to integrate the signal output from the phototube 64 over a period longer than the vertical deflection time but shorter than the drift frequency time, whereby to obtain a D.-C. output signal modulated by the drift frequency only. The 10 cycle signals from the output of the low pass filter are now fed to indicating means, such as a photocurrent meter 78 through an amplifier 80. The photocurrent meter 78 is of the D.-C. type commonly used to measure the amplifier current output of a phototube. The output of the amplifier 80 is also connected to additional indicating means, such as a modulation meter 82, through a rectifier 84 for the purpose of reading the precentage of modulation of the 10 cycle signal. The output of the amplifier 80 or the output of the rectifier 84 may be connected selectively to the automatic chart recorder 26 by means of a two position switch 86.

The automatic chart recorder 26 may be of the type manufactured by the Leeds and Northrop Company wherein a chart 60 moves in a vertically downward direction at a constant rate of speed. The output signals from the amplifier 80, or the rectifier 84, actuate an ink writer point 88 of the recorder 26 that will indicate the amplitude of the signal applied thereto, in a manner well known in the art.

The operation of the apparatus for measuring the optical sine-wave response of the kinescope 10 will now be summarized. The automatic chart recorder 26 is started so that the chart 60 begins to move in a downward direction and the movable contact 50 of the stepping relay switch 32 begins to move sequentially in steps from the fixed contact 52 to the contacts 54, 56 . . . 58n. When the movable contact 50 of the stepping relay switch 32 connects with the fixed contact 52 thereof, the 70 cycle sine-wave is applied to the grid 24 to modulate the electron beam of the kinescope 10 and to produce a sine-wave pattern on the screen 12. The optical signals from the sine-wave pattern on the screen 12 drifting at a frequency of 10 C. P. S., are converted into electrical signals by the phototube 64, integrated by the capacitor 72, and filtered by the low pass filter 76 so that only a signal of the drift frequency of 10 cycles is applied to the amplifier 80. The photocurrent meter 78 indicates the average current of the phototube 64. The modulating meter 82 indicates the percentage of modulation of the 10 cycle signal. When applied to the automatic chart recorder 26, through the switch 86, the output of the rectified drift frequency signal is recorded on the chart 60. For example, the drift frequency signal resulting from the 70 cycle oscillator 28 will cause the ink writing indicator 88 to swing from a zero position A to a line position 90, indicating a maximum signal that may be considered as 100 per cent modulation.

When the movable contact 50 of the relay switch 32 moves to connect the 130 cycle oscillator 38 to the grid 24 of the kinescope 10, the signals derived by the phototube 64 and applied to the automatic chart recorder 26 generally decrease in amplitude, as represented by the line 92 on the chart 60. As the oscillators 42 . . . 46 are sequentially applied to the grid 24 of the kinescope 10, theh electrical signals from the phototube 64, derived from the optical signals on the screen 12 of the kinescope 10, are applied to the automatic chart recorder in a similar manner, whereby to obtain a step trace, by the moving inked pointer 88 on the chart 60. A trace 100 so formed, is the optical sine-wave response of the kinescope 10. When similar kinescopes are tested under similar conditions by means of the apparatus described herein the engineer may determine the ability of each kinescope to transmit image detail information by examining the optical response curves for each kinescope. The greater the amplitude of the recorded signals on the chart with respect to their television line numbers, as may be calculated from the aforementioned formulae, the better is the ability of the kinescope, under test, to transmit image detail information. Thus, one aspect of the quality of a kinescope may be determined.

It is obvious to one skilled in the art that many changes may be made in theh illustrated and described embodiment of the present invention without departing from the spirit and scope of the invention. The embodiment of the invention thus described is, therefore, merely illustrative and is not to be construed in a limiting sense. The oscillators 22, 28, 38, 42, etc., for example, may be other than tuning fork oscillators. The kinescope 10 may be scanned electrostatically instead of electromagnetically. The phototube 64 may be a photomultiplier, and the automatic chart recorder may be replaced by an oscilloscope to display the optical sine-wave response curve 100.

It is further possible to dispense with the integrating capacitor 72 and filter circuit 76 and observe the modulation envelope of the phototube output voltage with an oscilloscope directly.

It is also obvious that an optical response curve, being the electro-optical transfer characteristic of the kinescope, can be obtained by substituting square-wave or sawtooth step wave oscillators, for example, for the modulating sine-wave oscillators.

What is claimed is:

1. Apparatus for measuring the optical response of a kinescope having a screen and a grid, said apparatus comprising means to scan said screen periodically with an electron beam in two substantially perpendicular directions simultaneously at two different frequencies respectively, means to modulate said grid with repetitive electrical A.-C. waves of a frequency differing from an integral multiple of said scanning frequency in one of said two directions by a predetermined number of cycles per second whereby to obtain a repetitive optical image on said screen drifting in said one of said two directions with a drift frequency of said predetermined number of cycles per second, means to convert the light from said drifting image at a predetermined point on said screen into electrical signals, means to filter said electrical signals with a low pass filter adapted to pass signals at said drift frequency and to attenuate signals at said scanning frequencies and higher, means to detect said passed signals, and means to indicate visually the amplitude of said detected passed signals.

2. Apparatus for measuring the optical response of a kinescope having a screen and a grid, said apparatus comprising means to scan said screen periodically with an electron beam in two substantially perpendicular directions simultaneously at two different frequencies respectively, means to modulate said grid with repetitive electrical A.-C. waves of a frequency differing from an integral multiple of said scanning frequency in one of said two directions by a predetermined number of cycles per second whereby to obtain a repetitive optical image on said screen drifting in said one of said two directions with a drift frequency of said predetermined number of cycles per second, means to convert the light from said drifting image at a predetermined point on said screen into electrical signals, means to integrate said electrical signals over a period longer than the scanning time in said one of said directions and shorter than said drift frequency time whereby to obtain a D.-C. output signal modulated by said drift frequency only, means to detect said modulating drift frequency signal, and means to indicate the amplitude of said detected modulating signal.

3. Apparatus for measuring the optical response of a kinescope having a screen and a grid, said apparatus comprising means to scan said screen periodically with an electron beam in two substantially perpendicular directions simultaneously at two different frequencies respectively, means to modulate said grid with repetitive electrical A.-C. waves of a frequency differing from an integral multiple of said scanning frequency in one of said two directions by a predetermined number of cycles per second whereby to obtain a repetitive optical image on said screen drifting in said one of said two directions with a drift frequency of said predetermined number of cycles per second, means to convert the light from said drifting image at a predetermined point on said screen into electrical signals, means to filter said electrical signals with a low pass filter adapted to pass signals at said drift frequency and to attenuate signals at said scanning frequencies and higher, means to detect said passed signals, means to indicate the amplitude of said detected passed signals, and means to blank said beam during the retraces of said beam in each of said two directions of scanning.

4. Apparatus for measuring the optical response of a kinescope having a screen and a grid, said apparatus comprising means to scan said screen periodically with an electron beam in two substantially perpendicular directions simultaneously at two different frequencies respectively, means to modulate said grid with repetitive electrical A.-C. waves of a frequency differing from an integral multiple of said scanning frequency in one of said two directions by a predetermined number of cycles per second whereby to obtain a repetitive optical image on said screen drifting in said one of said two directions with a drift frequency of said predetermined number of cycles per second, means to convert the light from said drifting image at a predetermined point on said screen into electrical signals, means to integrate said electrical signals over a period longer than the scanning time in said one of said directions and shorter than said drift frequency time whereby to obtain a D.-C. output signal modulated at said drift frequency only, means to detect said modulating drift frequency signal, means to indicate the amplitude of said detected signal, and means to blank said beam during the retraces of said beam in each of said two directions of scanning.

5. Apparatus for measuring the optical response of a cathode ray tube of the type having a screen, an electron gun to furnish an electron beam and a grid for modulating said beam, said apparatus comprising means to scan said screen with said beam periodically in substantially two perpendicular directions simultaneously at two different frequencies respectively, a plurality of oscillators each having a frequency of oscillation differing progressively from a different integral multiple of one of said scanning frequencies by a predetermined number of cycles per second, means to apply electrical oscillations from said oscillators sequentially to said grid whereby to produce a repetitive optical image on said screen drifting in one of said directions with a drift frequency of said predetermined number of cycles per second, means to convert the light from said drifting image at a predetermined point on said screen into electrical signals, low pass filtering means adapted to pass electrical signals of said drift frequency and to filter out signals of said scanning frequencies and higher, means to pass said electrical signals through said filtering means whereby to obtain a D.-C. output signal modulated at said drift frequency, means to detect said drift frequency output signal, and means to indicate the amplitude of said detected output signal.

6. Apparatus for measuring the optical response of a cathode ray tube of the type having a screen, an electron gun to furnish an electron beam and a grid for modulating said beam, said apparatus comprising means to scan said screen with said beam periodically in substantially two perpendicular directions simultaneously at two different frequencies respectively, a plurality of oscillators each having a frequency of oscillation differing progressively from a different integral multiple of one of said scanning frequencies by a predetermined number of cycles per second, means to apply electrical oscillations from said oscillators sequentially to said grid whereby to produce a repetitive optical image on said screen drifting in one of said directions with a drift frequency of said predetermined number of cycles per second, means to convert the light from said drifting image at a predetermined point on said screen into electrical signals, means to integrate said electrical signals over a period longer than the scanning time in said one of said directions and shorter than said drift frequency time whereby to obtain a D.-C. output signal modulated at said drift frequency, means to detect said drift frequency output signal, and means to indicate the amplitude of said detected output signal.

7. Apparatus for measuring the optical response of a cathode ray tube of the type having a screen, an electron gun to furnish an electron beam and a grid for modulating said beam, said apparatus comprising means to scan said screen with said beam periodically in substantially two perpendicular directions simultaneously at two different frequencies respectively, a plurality of oscillators each having a frequency of oscillation differing progressively from a different integral multiple of one of said scanning frequencies by a predetermined number of cycles per second, means to apply electrical oscillations from said oscillators sequentially to said grid whereby to produce a repetitive optical image on said screen drifting in one of said directions with a drift frequency of said predetermined number of cycles per second, means to convert the light from said drifting image at a predetermined point on said screen into electrical signals, low pass filtering means adapted to pass electrical signals of said drift frequency and to filter out signals of said scanning frequencies and higher, means to pass said electrical signals through said filtering means whereby to obtain a D.-C. output signal modulated at said drift frequency, means to detect said drift frequency output signal, means to indicate the amplitude of said detected output signal, and means to blank said beam during the retraces thereof in each of said two directions of scanning.

8. Apparatus for measuring the optical sine-wave response of a cathode ray tube of the type having a screen, an electron gun adapted to provide an electron beam and a grid, said apparatus comprising means to scan said screen with said beam periodically in one direction at a relatively low frequency and in a second direction substantially perpendicular to said one direction at a relatively higher frequency, a plurality of sine-wave oscillators each of a frequency differing from the other by an integral multiple of said low frequency and each differing progressively from a different integral multiple of said low frequency by a fixed number of cycles per second, means including a switch to apply oscillations of equal amplitude from said oscillators sequentially to said grid whereby to produce a sine-wave optical pattern on said screen drifting in said one direction with a drift frequency of said fixed number of cycles per second, means including photoelectric means having an anode and a cathode to convert light from said pattern at a predetermined point on said screen into electrical signals, a low pass filter adapted to pass signals at said drift frequency only, a cathode follower tube having a cathode, means including an integrating capacitor connected between said anode of said photoelectric means and said cathode of said cathode follower tube to connect said anode to said low pass filter, indicating means, and means connecting said indicating means to the output of said filter.

9. Apparatus for measuring the sine-wave response of a cathode ray tube as defined in claim 8 wherein said indicating means comprises an automatic chart recorder having means to move a chart in one direction, and linkage means from said chart recorder to said switch to apply said oscillators sequentially to said grid during the movement of said chart.

10. Apparatus for measuring the optical response of a cathode ray tube of the type having a screen, an electron gun to furnish an electron beam and a grid for modulating said beam, said apparatus comprising means to scan said screen with said beam periodically in substantially two perpendicular directions simultaneously at two different frequencies respectively, a plurality of oscillators each having a frequency of oscillation differing progressively from a different integral multiple of one of said scanning frequencies by a predetermined number of cycles per second, means to apply electrical oscillations from said oscillators sequentially to said grid whereby to produce a repetitive optical image on said screen drifting in one of said directions with a drift frequency of said predetermined number of cycles per second, means to convert the light from said drifting image at a predetermined point on said screen into electrical signals, and means to indicate said converted electrical signals visually whereby they may be observed.

11. Apparatus for measuring the optical response of a cathode ray tube of the type having a screen, an electron gun to furnish an electron beam and a grid for modulating said beam, said apparatus comprising means to scan said screen with said beam periodically in substantially two perpendicular directions simultaneously at two different frequencies respectively, a plurality of sawtooth stepwave oscillators each having a fundamental frequency of oscillation differing progressively from a different integral multiple of one of said scanning frequencies by a predetermined portion of a cycle, means to apply electrical oscillations from said oscillators sequentially to said grid whereby to produce a repetitive optical image on said screen drifting in one of said directions with a drift frequency of said predetermined portion of a cycle, means to convert the light from said drifting image at a predetermined point on said screen into electrical signals, and means to indicate said converted signals visually whereby they may be observed.

No references cited.